(12) United States Patent
Scully

(10) Patent No.: US 6,722,512 B2
(45) Date of Patent: Apr. 20, 2004

(54) CARGO SHIELD

(75) Inventor: Geoffrey B. Scully, Adrian, MI (US)

(73) Assignee: Cargotainer Adrian Fabricators, Inc., Adrian, MI (US)

( * ) Notice: Subject to any disclaimer, the term of this patent is extended or adjusted under 35 U.S.C. 154(b) by 0 days.

(21) Appl. No.: 10/211,899

(22) Filed: Aug. 2, 2002

(65) Prior Publication Data

US 2004/0020886 A1 Feb. 5, 2004

(51) Int. Cl.[7] .................................................. A47F 5/00
(52) U.S. Cl. ........................ 211/183; 211/175; 211/191; 211/180
(58) Field of Search ................................ 211/183, 180, 211/189, 191, 175, 186, 192; 312/3–6; 160/371, 327, 330, 332, 194; 49/49, 263

(56) References Cited

U.S. PATENT DOCUMENTS

| | | | |
|---|---|---|---|
| 844,687 A | * 2/1907 | Miller et al. ................. | 211/175 |
| 3,827,574 A | 8/1974 | Craig, Sr. .................... | 211/184 |
| 4,437,572 A | 3/1984 | Hoffman ....................... | 211/86 |
| 4,729,485 A | 3/1988 | Kulbersh ..................... | 211/184 |
| 4,981,225 A | 1/1991 | Cole .......................... | 211/183 |
| 5,170,829 A | 12/1992 | Duncan et al. ............. | 160/84.1 |
| 5,573,125 A | 11/1996 | Denny ......................... | 211/183 |
| 5,791,501 A | 8/1998 | Baldwin, Jr. ................ | 211/183 |
| 5,984,121 A | 11/1999 | Cole .......................... | 211/183 |
| 6,585,122 B2 | * 7/2003 | Calleja ....................... | 211/183 |
| 2002/0144966 A1 | * 10/2002 | Calleja ....................... | 211/183 |
| 2002/0148799 A1 | * 10/2002 | Denny et al. ................ | 211/186 |

* cited by examiner

Primary Examiner—Jennifer E. Novosad
(74) Attorney, Agent, or Firm—Young & Basile, P.C.

(57) ABSTRACT

A cargo shield assembly having rigid members mountable to the vertical uprights of a pallet rack. The assembly having a wire mesh panel movable in a vertical direction. The panels are connected to rods extending along the lateral ends of the panel, and the rods are movably connected to the rigid members. The cargo shield assembly has a locking mechanism to maintain the panel in an upward position and a stop member to limit the travel of the panel in both an upward and a downward motion.

19 Claims, 6 Drawing Sheets

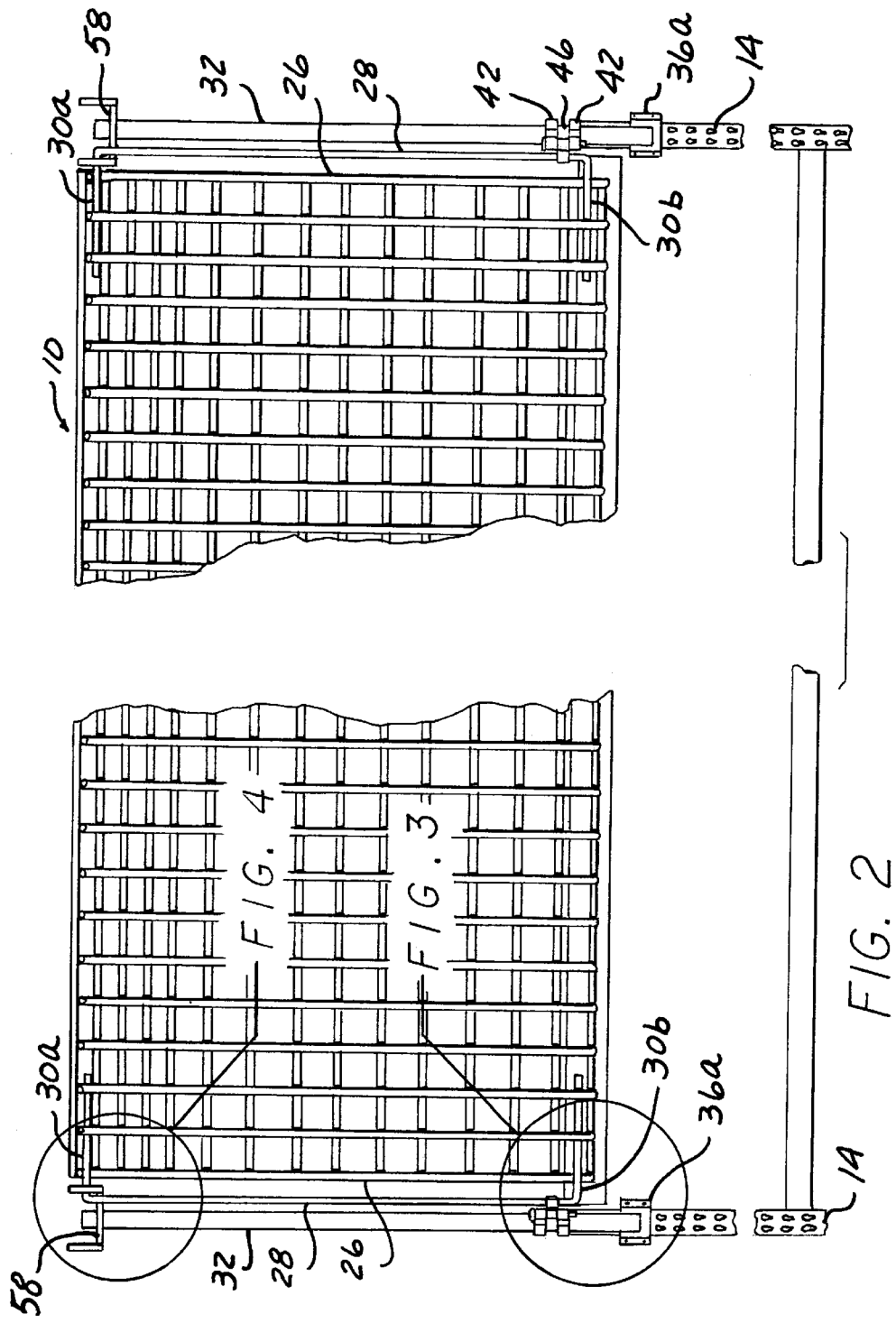

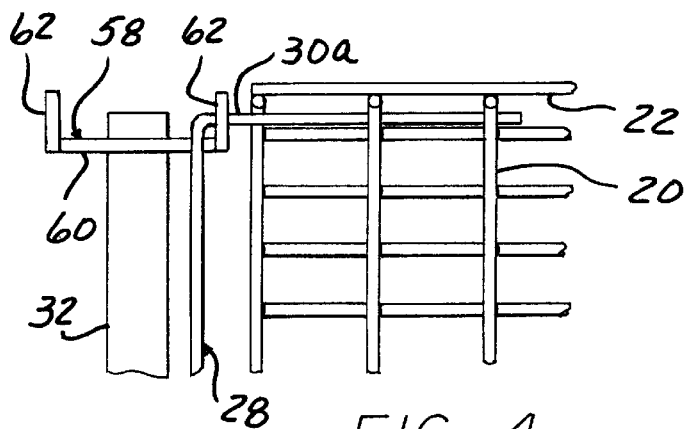
FIG. 4
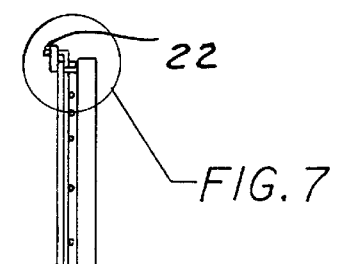
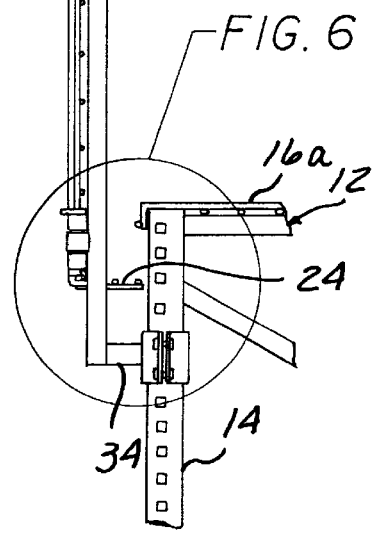
FIG. 5A
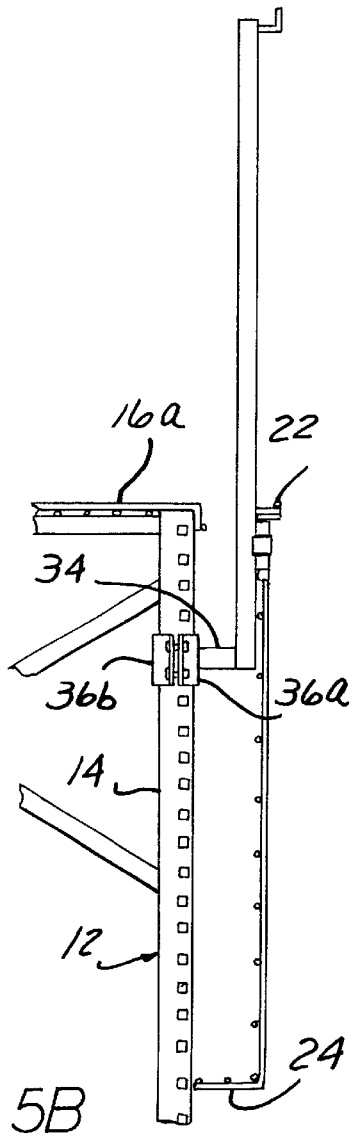
FIG. 5B

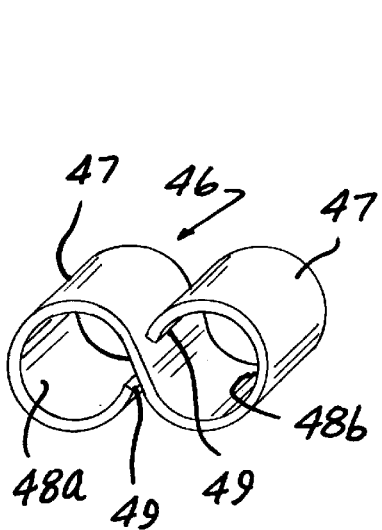
FIG. 10
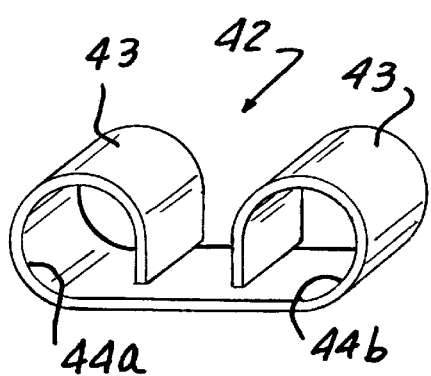
FIG. 11
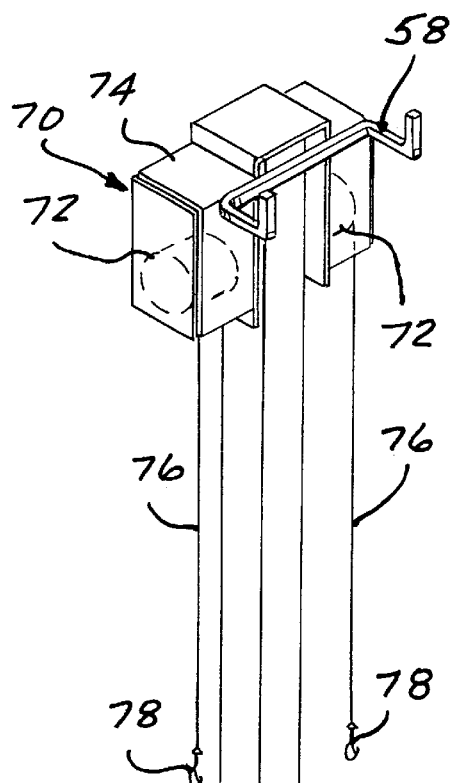
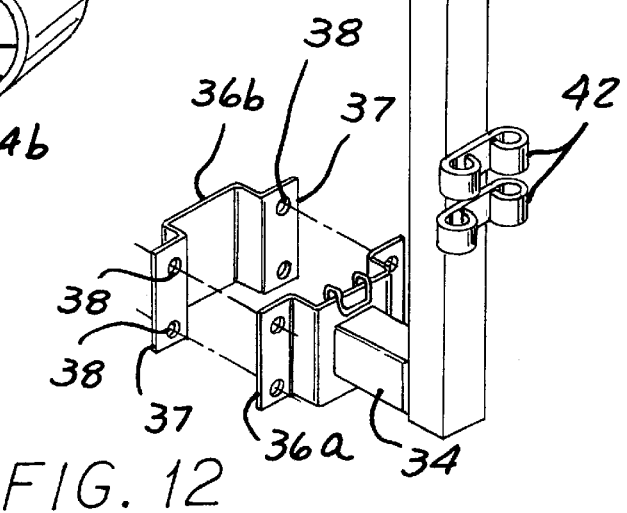
FIG. 12

CARGO SHIELD

FIELD OF THE INVENTION

The invention relates to a shield assembly for a shelf rack, particularly for use on a shelf in a store or warehouse.

BACKGROUND OF THE INVENTION

Many merchandise stores, and especially large warehousing retailers, store their articles for sale on large shelf racks which may include pallets of items for display and storage. Many of these pallets of items are positioned on upper shelves by means of forklifts. For the protection of its customers, it is imperative that items from these upper shelves do not accidently drop from these upper heights. Safety systems have been provided in the past to minimize safety risks and minimize risks to the customer. Many of these safety systems include the use of a net to secure the articles on the upper shelves. The net systems are generally made of a flexible material that can easily retract. However, the net system does not provide adequate strength for larger and heavier articles. Therefore, it is desirable to provide a safety system where the panel is made from a stronger material than netting but also provides accessibility to the articles located on the upper shelves.

SUMMARY OF THE INVENTION

A safety cargo shield system is provided for connection to a shelf rack having vertical uprights and horizontal shelving therebetween for the placement of articles. The shield assembly includes upright members securely connected to the vertical uprights of the shelf rack. A wire mesh panel is connected to rigid rods at its lateral ends. The rigid rods and wire mesh panel are movably connected between a pair of the upright members so that the wire mesh panel can move between an up position to protect articles from falling from the horizontal shelving and a down position to allow for access to the articles stored on the horizontal shelving.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a fragmentary front view of the cargo shield shown in the raised position without the optional retractable safety cord mechanism;

FIG. 4 is an enlarged view of the circled area of FIG. 2, showing a locking mechanism of the cargo shield assembly;

FIG. 5a is a side elevational view of the cargo shield in the raised position;

FIG. 5b is a side elevational view of the cargo shield in the lowered position;

FIG. 10 is a perspective view of an S-strap collar used in the cargo shield assembly;

FIG. 11 is a perspective view of a two-eyed strap collar used in the cargo shield assembly;

FIG. 12 is a perspective view of the extension post having the retractable safety cord mechanism used in the cargo shield assembly;

DESCRIPTION OF THE PREFERRED EMBODIMENT

Figure 1:
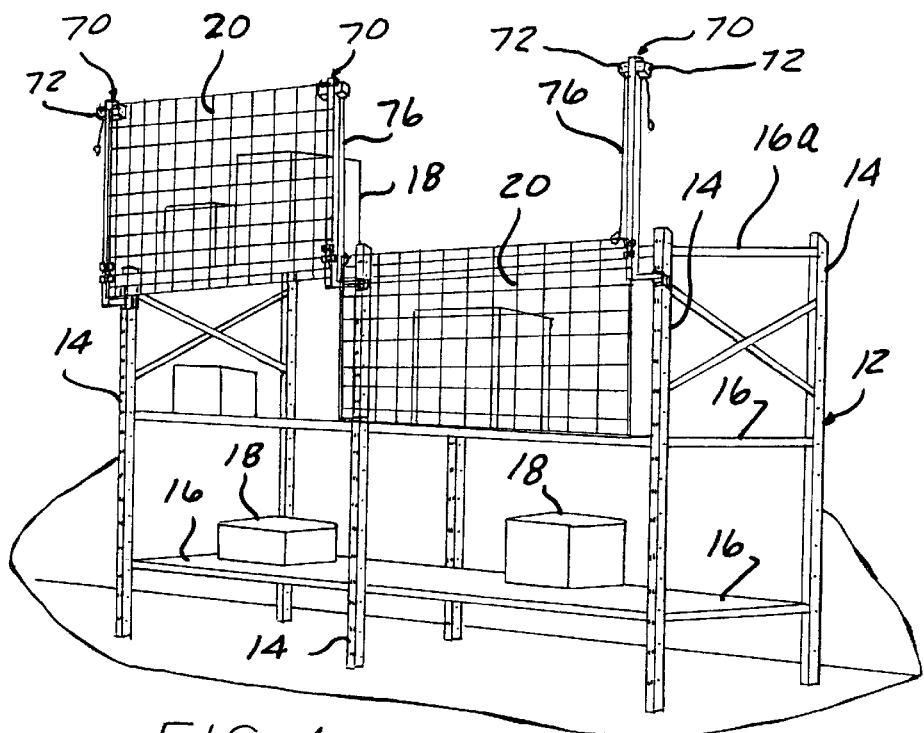
FIG. 1 is a perspective view of the cargo shield assembly for a pallet rack according to the present invention with an optional retractable safety cord mechanism, showing one cargo shield in a raised position and in another cargo shield in a lowered position.

Referring to the drawings, a cargo shield assembly generally denoted as 10 provides a safety cargo shield for a conventional pallet rack 12 typically used in storage, warehouse and merchandise facilities. The pallet rack 12 generally includes vertical uprights 14 and horizontal rack decking or shelving 16 for placement of the stored articles 18. The cargo shield assembly 10 of the present invention is particularly beneficial for articles 18 stored on the uppermost horizontal shelf 16a. Because of their height and because the uppermost shelving 16a is not surrounded by the vertical uprights 14, articles located on the uppermost shelving 16a are the most apt to cause injury should they inadvertently fall off of the shelving 16a.

The cargo shield assembly 10 is adapted for mounting to the vertical rack uprights 14 of a conventional pallet rack 12. The cargo shield assembly 10 includes an essentially rigid wire mesh panel 20 defining the actual cargo shield 20, which is extendable over any face of the pallet rack 12, but especially over the front and rear faces of the pallet rack 12.

With reference to FIGS. 2–6, a panel 20 is preferably composed of a series of semi-rigid, horizontal and vertical wires that are resistance-welded to form the wire mesh panel 20. The wire mesh panel 20 is formed so that the upper periphery forms a 90° bend 22 directed outwardly away from the pallet rack 12. This upper bend 22 provides added strength to the panel 20 as well as providing a handle for manually lowering and raising the cargo shield 20. The bottom edge of the panel 20 also forms a 90° bend 24. However, the bottom peripheral edge has a 90° bend 24 directed inwardly toward the pallet rack 12. The bottom peripheral bend 24 has a predetermined depth to provide proper standoff distance from the vertical rack uprights 14 and the horizontal shelving 16. This predetermined depth allows for adequate space for pallets of articles 18 that may extend beyond the horizontal shelving 16. In addition, the lower peripheral bend 24 forms a horizontal cage and can maintain fallen articles 18, within the panel area.

The lateral edges 26 of the panel 20 are each connected to, preferably by welding, to steel rods 28. The steel rods 28 are welded to the wire panel 20 adjacent to the upper and lower periphery bends 22, 24, respectively, of the panel 20. As shown in FIGS. 2 and 4, the steel rod 28 is offset or spaced from the panel 20 so that it can be used as a guide for moving the panel 20 up and down. At the upper and lower ends of the steel rods 28, there are preferably 90° bend portions 30a, b. These bend portions 30a, b are the portions connected to the panel 20 as well as providing other functions as described hereinafter. The bend portions 30a, b of the steel rods 28 are connected to the panel 20 adjacent to the upper and lower bend portions 22, 24, respectively, of the panel 20.

Figure 6:
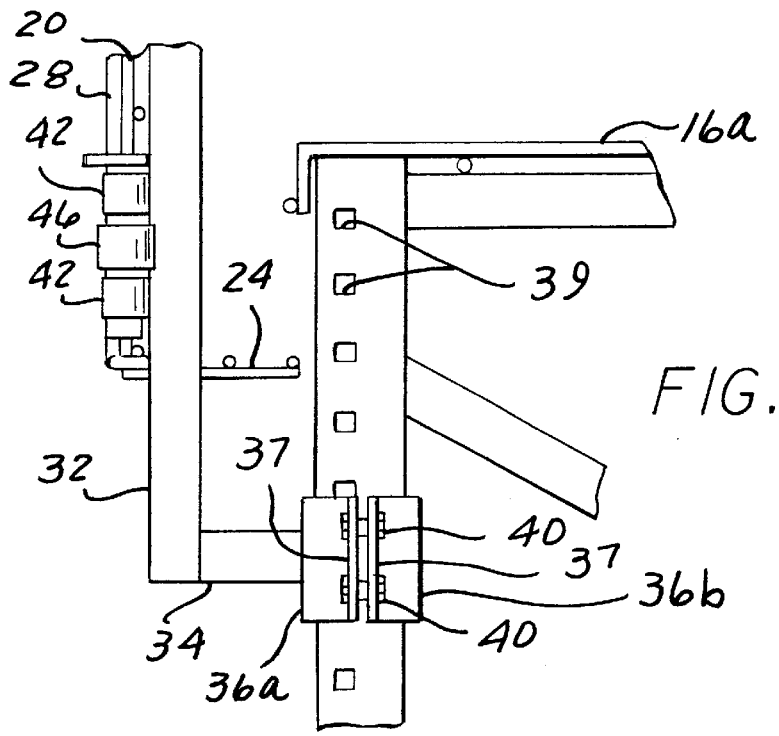
FIG. 6 is an enlarged view of the circled area in FIG. 5a showing the connection assembly of the cargo shield assembly.
Figure 7:
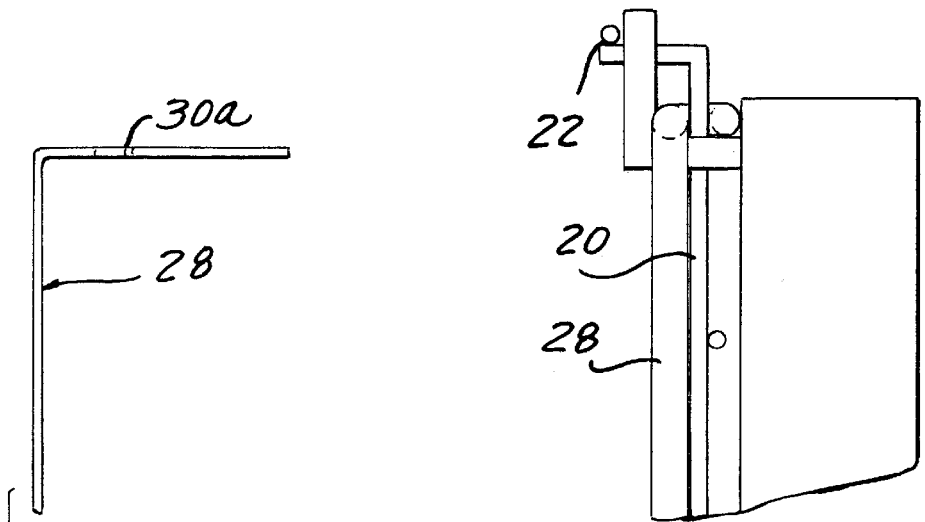
FIG. 7 is an enlarged view of the circled area in FIG. 5a showing the locking mechanism of the cargo shield assembly.
Figure 8:
FIG. 8 is a fragmentary side elevational view of a side rail used for the cargo shield assembly in the present invention.
Figure 9:
FIG. 9 is a top view of the side rail shown in FIG. 8.
Figure 13:
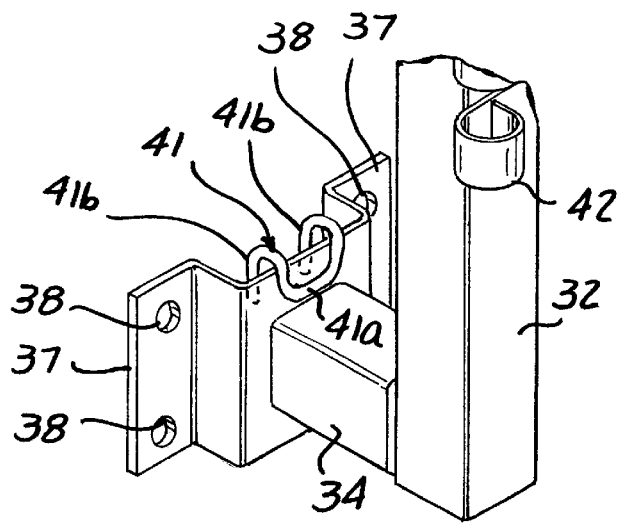
FIG. 13 is an enlarged perspective view of one of the mounting brackets shown in FIG. 12.

The cargo shield assembly 10 further includes a pair of extension posts 32, one extension post 32 for each lateral side of the panel 20. The extension posts 32 are preferably metallic tubing material mounted in a vertical position to the vertical rack uprights 14. As seen in FIG. 6, each extension post 32 is preferably mounted to the vertical rack uprights 14 so that each extension post 32 extends above the uppermost horizontal shelf 16a. Each extension post 32 is mounted to the vertical rack upright 14 via a short extension segment 34 positioned at essentially a 90° angle from the extension post 32. The short extension segment 34 is also made of a metallic tubing material and has a length generally the same length as the predetermined length of the bend 24 of the lower peripheral panel. The length of the short extension segment 34 provides the proper standoff distance from the vertical rack upright 14. Each short extension segment 34 is connected to one of the vertical rack uprights 14 by means of a pair of mounting brackets 36a,b at the same height on each vertical rack upright 14. The mounting brackets 36a,b are also shown in FIGS. 12 and 13. The pair of mounting brackets 36a,b have essentially U-shaped formations with end flanges 37. Through apertures 38 are formed in the end flanges 37 and aligned to receive conventional nut and bolt connections 40. The U-shaped formation of the mounting brackets 36a,b allow each bracket to be placed on opposing sides of the vertical uprights 14 so that the end flanges 37 and corresponding apertures 38 align to receive the conventional nut and bolt connections 40. Using a pair of mounting brackets 36a,b as described allows for connection of the extension posts 32 to various dimensions of vertical uprights 14 that are available on existing pallet racks 12.

As shown in FIGS. 12 and 13, one of the mounting brackets 36a,b is connected, preferably by welding, to the short extension segment 34. The mounting bracket 36a,b which is connected to the short extension segment 34 and therefore also to the extension post 32, has a hook 41 a welded thereon. The hook 41 has a general C-formation with a center arcuate portion 41a welded to the center face of the mounting bracket 36a located above the bracket's 36a connection to the short extension segment 34. The hook 41b has two end portions 41b which are positioned to extend over the mounting bracket 36a for latching into a pair of corresponding slots 39 in the vertical uprights 14. The two end portions 41b of the hook 41 extend downward relative to the extension post 32 so that the two end portions 41b of the hook 41 hold the extension post 32 to the vertical upright 14 as the other bracket 36b is connected via nut and bolt connections 40 to the bracket 36a with the vertical upright 14 disposed therebetween.

Figure 3:
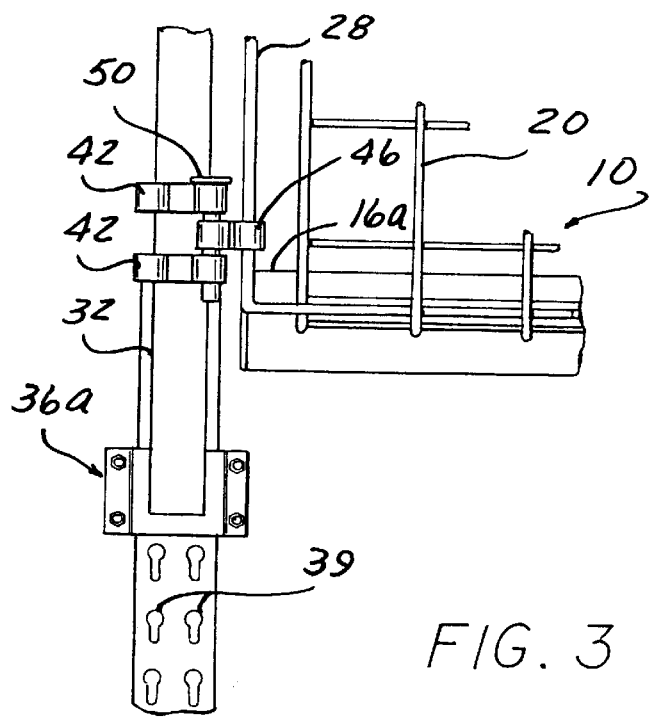
FIG. 3 is an enlarged view of the circled area in FIG. 2 showing a connection assembly of the cargo shield assembly.
Figure 15:
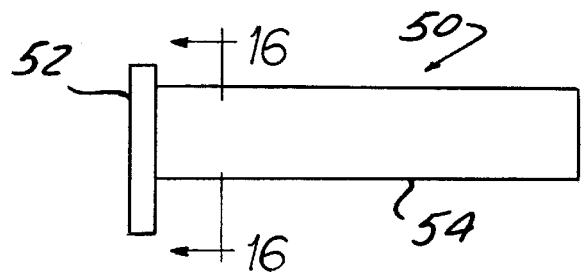
FIG. 15 is a side elevational view of a mounting pin used in the cargo shield assembly.
Figure 16:
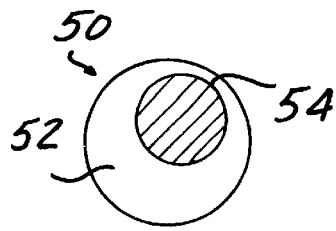
FIG. 16 is a sectional view of the mounting pin taken along lines 16—16 of FIG. 15.

Referring to FIGS. 3, 10, and 11, a pair of two-eyed strap collars 42 are connected to each extension post 32. The two-eyed strap collar 42 is connected by welding the collar 42 to the extension post 32 such that the two arcuate portions 43 which form slots 44a, b extend partially beyond the extension post as shown in FIG. 3. The pair of two-eyed strap collars 42 are spaced from each other on the extension post 32, so that a portion of an S-strap collar 46 can be disposed between the pair of two-eyed strap collars 42. The S-strap collar 46 also has a pair of arcuate portions 47 which form slots 48a, b. One of the slots 48a of the S-strap collar 46 is aligned with the pair of slots 44b of the two-eyed strap collar 42. The three aligned slots (one slot 44b each of the two-eyed strap collars 42 and the one slot 48a from the S-strap collar 46) now receive a mounting pin 50, as shown in FIGS. 15 and 16, for connection of the panel 20 to the extension post 32. As can be seen in FIGS. 15 and 16, the flat washer portion 52 of the mounting pin 50 is offset on the linear steel pin portion 54. This configuration allows clearance between the flat washer cap 52 and the extension post 32 when installed. The other slot 48b of the S-strap collar 46 is used to receive one of the steel rods 28. In this way, the S-strap collar 42 connects the wire mesh panel 20 to the extension post 32 via the steel rod 28. The steel rod 28 is movable through slot 48b. The movement of the steel rod 28 through the slot 48b of the S-strap collar 46 provides a guide for movement of the panel 20 in an upward and downward position. Further, the S-strap collar 46 acts as a stop for the movement of the panel 20 when either of the upper bend portion 30a of the steel rod 28 or the lower bend portion 30b of the rod contacts the S-strap collar 46. It is to be understood that the slots 48a, b in the S-strap collar 46 are essentially identical and the S-strap collar 46 may be orientated so that either slot 48a or 48b may be used for either of the aforementioned functions.

Figure 14:
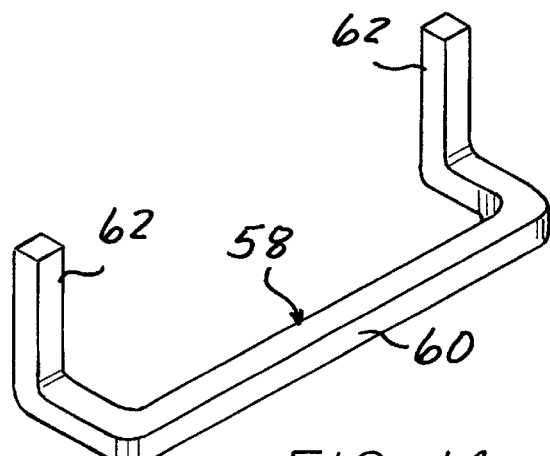
FIG. 14 is a perspective view of a retaining hitch used in the cargo shield assembly.

A retaining hitch 58 is provided as a locking mechanism for the shield 20 in its "up" position. The retaining hitch 58 is shown in FIG. 14 and is formed from a steel-formed bar and is attached at the upper end of each extension post 32. The retaining hitch 58 preferably has a U-shaped configuration with a center linear portion 6 and two upwardly extending prongs 62 at each end. The panel 20 is locked in its upward position by hooking the upper bend portions 30a of the steel rods 28 over the adjacent retaining hitches 58. The pair of upward extending prongs 62 prevent the steel rods 28 from slipping off the retaining hitch 58. Although the retaining hitch 58 is shown in its preferable configuration, other configurations having a pair of upward extending prongs are possible.

To lower the panel 20 in order to gain access to the articles 18 secured on the upper horizontal shelving 16a, the upper bend portion 30a that is connected at each lateral edge 26 of the panel 20 can be manually lifted over the retaining hitches 58. The panel 20 and associated steel rods 28 will slide through the guide formed by the through apertures 48b of the S-strap collars 46 as the panel lowers until the upper bend portions 30a contact the S-strap collars 46. In this manner, the S-strap collars 46 provide a stop for the panel 20.

When the panel 20 is to be raised, an operator can grip the handle formed by the 90° bend 22 at the upper periphery of the panel to manually raise the panel 20 until the lower 90° bend portions 30b of the steel rods 28 contact the S-strap collars 46. The cargo shield assembly 10 is configured such that when the lower 90° bend portions 30b of the steel rods 28 contact the S-strap collars 46, the upper bend portions 30a are positioned slightly above the retaining hitches 58. This allows the upper bend portions 30a of the steel rod to be hooked over the retaining hitches 58 to be locked in the "up" position.

Controlled movement of the panel 20 may be enhanced by means of a retractable safety cord mechanism 70 as shown in FIGS. 1 and 12. The retractable safety cord mechanism 70 is an optional feature which provides tension on the panel 20 to control its downward movement. The retractable safety cord mechanism 70 includes a conventional retracting device 72 which may include a spool about which a cord or cable 76 is wound. The retracting device 72 may be placed within a housing 74 adjacent to the retaining hitch 58 at the top of the extension post 32. The retracting device 72 or housing 74 can be welded or otherwise connected to the extension post 32. The cord or cable 76 is biased to remain wound about the spool of the retracting device 72. At the free end of the cord or cable 76, a convention hook 78 is provided to manually latch onto the steel rod 28 or other portion of the panel 20. When the hook 78 is latched onto the panel 20, the biasing nature of the retracting device 72 controls the and slows downward movement of the panel 20 when the panel 20 is manually lifted over the retaining hitches. When the panel 20 is raised, the connected cord or cable 76 retracts back into the retracting device 72.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A shield assembly for a shelf rack having vertical rack uprights having slots therein and horizontal shelving including uppermost shelving therebetween for the placement of articles, the shield assembly comprising:

rigid rod members positioned parallel to the vertical rack uprights wherein said rigid rod members are slidably connectible to the shelf rack; and shelf rack; and a semi-rigid mesh panel connected to the rigid rod members at opposing ends of the panel; wherein the entire mesh panel and rigid rod members move vertically relative to the shelf rack for allowing access to articles on the horizontal shelving.

2. The shield assembly of claimed 1, further comprising:
   means for locking the mesh panel and rigid rod members in an upward position.

3. The shield assembly of claim 2, wherein the locking means includes a retaining hitch defined by an essentially U-shaped member.

4. The shield assembly of claim 1 further comprising:
   guide members for guiding the movement of the panel vertically relative to the shelf rack, wherein said guide members include collars having through apertures for receiving the rigid rod members therethrough.

5. The shield assembly of claim 1, wherein the assembly is configured to allow clearance between the mesh panel and horizontal shelving of the shelf rack.

6. The shield assembly of claim 5, wherein the mesh panel has an essentially 90° bend along an upper peripheral edge of said mesh panel for providing a handle.

7. The shield assembly of claim 5, wherein the mesh panel hag an essentially 90° bend along an lower peripheral edge of said panel for forming a horizontal case.

8. The shield assembly of claim 1, further comprising vertical tubular members securely connectible to the vertical rack uprights, wherein the rigid rod members are movably connected to the vertical tubular members.

9. The shield assembly of claim 8, further comprising a stop device communicating with the rigid rod members for limiting the travel of the panel in an upward and downward position relative to the vertical tubular members.

10. The shield assembly of claim 8, further comprising at least one two-eyed strap collar for connecting one of the rigid rod members to one of the tubular members.

11. The shield assembly of claim 10, further comprising guide members communicating with the rigid rod members for guiding the movement of the panel relative to the shelf rack.

12. The shield assembly of claim 8, further comprising a retractable safety cord mechanism connected to a top end of at least one of the vertical tubular numbers for controlling the movement of the mesh panel relative to the shelf rack.

13. The shield assembly of claim 1, further comprising:
    mounting means for connecting the mesh panel and rigid rod members to the vertical rack uprights, said mounting means adaptable for connecting the rigid rod members to any predetermined dimension of the vertical rack uprights.

14. The shield assembly of claim 13, further comprising a C-shaped shaped hook connected to the mounting means for latching into the slots in the vertical rack uprights.

15. The shield assembly of claim 1, wherein vertical tubular members extend above the uppermost shelving and the vertical rack uprights.

16. A shield assembly for a shelf rack having vertical rack uprights and horizontal shelving therebetween for the placement of articles, the shield assembly comprising:

a mesh panel connected to rigid members at opposing ends of the panel, wherein said rigid members are slidably connectible to the shelf rack;

means for moving the mesh panel and rigid members vertically relative to the shelf rack for access to articles on the horizontal shelving; and guide members communicating with the rigid members for guiding the movement of the panel relative to the shelf rack, wherein the guide members include at least one S-strap collar.

17. The shield assembly for a shelf rack having vertical rack uprights and horizontal shelving therebetween for the placement of articles, the shield assembly comprising:

a mesh panel connected to rigid members at opposing ends of the panel, wherein said rigid members are slidably connectible to the shelf rack;

means for moving the mesh panel and rigid members vertically relative to the shelf rack for access to articles on the horizontal shelving;

tubular members securely connectible to the vertical rack uprights, wherein one rigid member is movably connected to one of the tubular members;

at least one two-eyed strap collar for connecting one of the rigid members to one of the tubular members; and guide members communicating with the rigid members for guiding the movement of the panel, wherein the guide members include at least one S-strap collar.

18. The shield assembly of claim 17, wherein the S-strap collar has one slot for movably receiving one of the rigid members, and said S-strap collar has a second slot for aligning with one of the eyes of the two-eyed strap collar, said second slot of said S-strap collar and said aligned eye of the two-eyed strap collar having a mounting pin disposed therein.

19. The shield assembly of claim 14, wherein the mounting pin has an offset washer cap.

* * * * *